United States Patent [19]
Murphy et al.

[11] Patent Number: 4,595,146
[45] Date of Patent: Jun. 17, 1986

[54] GRANULAR AND POWDERED MATERIAL FEEDER/APPLICATOR

[76] Inventors: James E. Murphy, 1921 Sherwood Dr.; Ralph F. DeTray, R.F.D. #8–Bowman Rd., both of Defiance, Ohio 43512

[21] Appl. No.: 659,537

[22] Filed: Oct. 10, 1984

[51] Int. Cl.[4] .................. A01C 19/00; A01C 3/06; B65G 25/00; B66C 17/08
[52] U.S. Cl. .................... 239/682; 239/673; 239/689; 414/165; 414/195
[58] Field of Search ............ 239/666, 673, 682, 684, 239/687, 689; 414/160, 162, 165, 195, 205, 206, 301

[56] References Cited

U.S. PATENT DOCUMENTS

| | | | |
|---|---|---|---|
| 2,500,682 | 3/1950 | Hoffstetter | 239/666 |
| 3,171,658 | 3/1965 | Clark | 239/687 |
| 4,142,880 | 3/1979 | Wenda et al. | 414/165 |
| 4,316,581 | 2/1982 | Van Der Lely et al. | 239/682 |

FOREIGN PATENT DOCUMENTS 2019705 11/1979 United Kingdom ............ 239/682

Primary Examiner—Joseph F. Peters, Jr.
Assistant Examiner—Patrick N. Burkhart
Attorney, Agent, or Firm—Harvey B. Jacobson

[57] ABSTRACT

A three-armed spider frame is provided including depending supports at the free ends of its arms and a center mount outwardly from which the three arms radiate. An upwardly opening hopper is journaled from the frame for rotation about a central upstanding axis and includes a plurality of lower outlets spaced outwardly from and about the hopper rotation axis. Each of the outlets includes dispensing structure for dispensing fluent material discharged from the outlets in sector-shaped horizontal patterns and structure is provided whereby the horizontal patterns may be selectively angularly displaced about the corresponding outlets. Further, variable speed motor structure is drivingly coupled to the hopper for rotating the latter relative to the frame and the interior of the hopper is divided into a plurality of upwardly opening compartments each serving a corresponding lower outlet.

11 Claims, 9 Drawing Figures

U.S. Patent   Jun. 17, 1986   Sheet 1 of 4   4,595,146
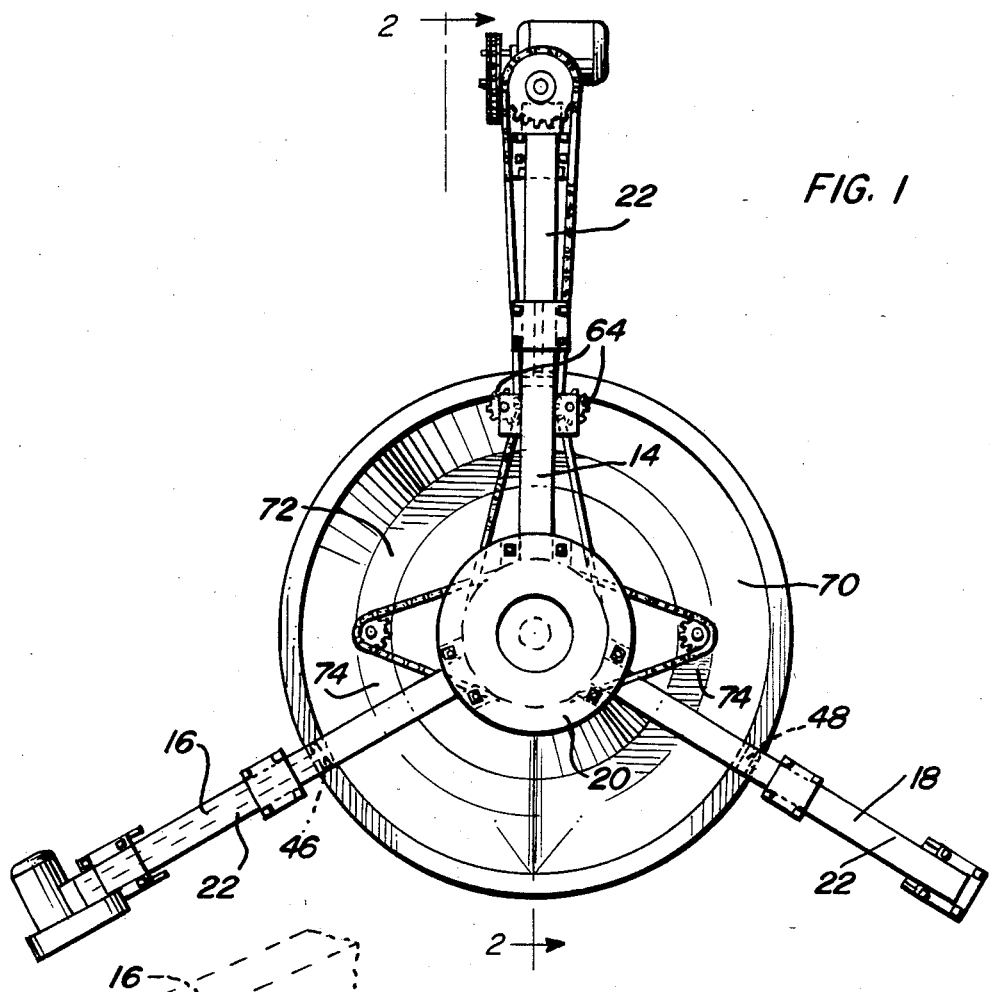
FIG. 1
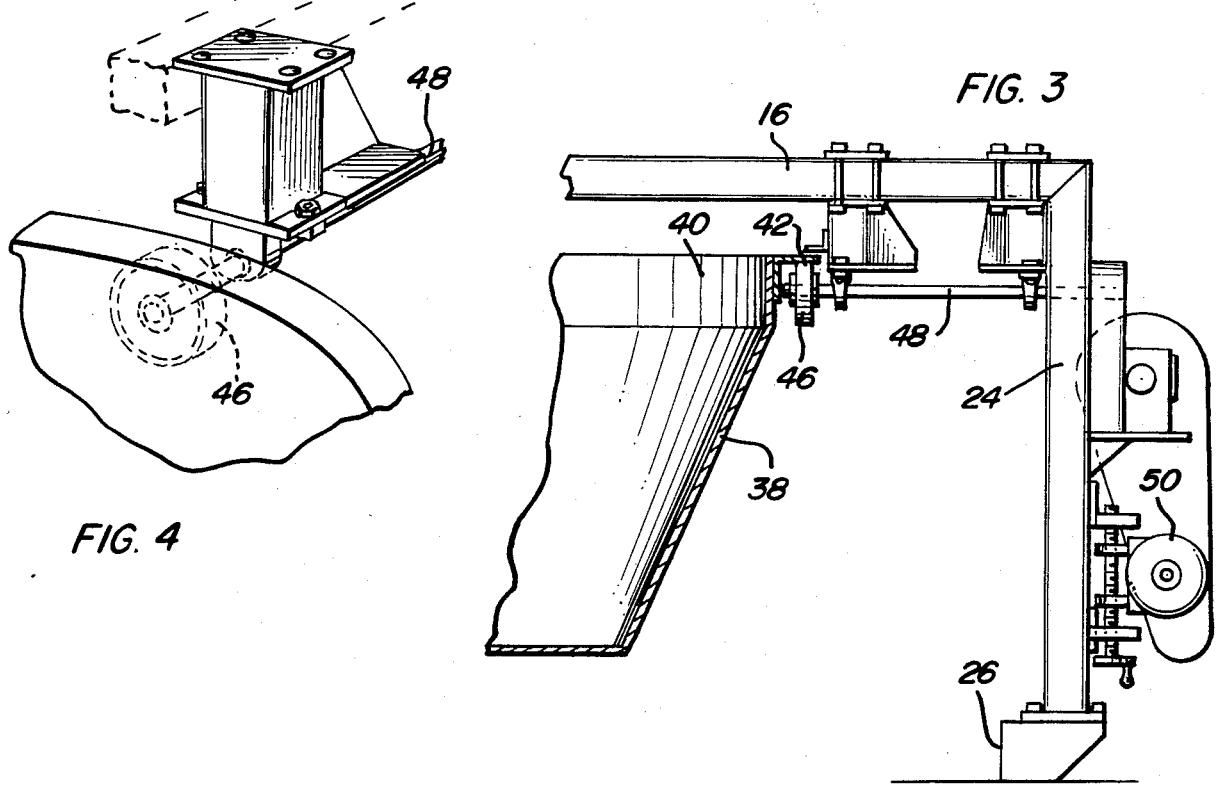
FIG. 4
FIG. 3

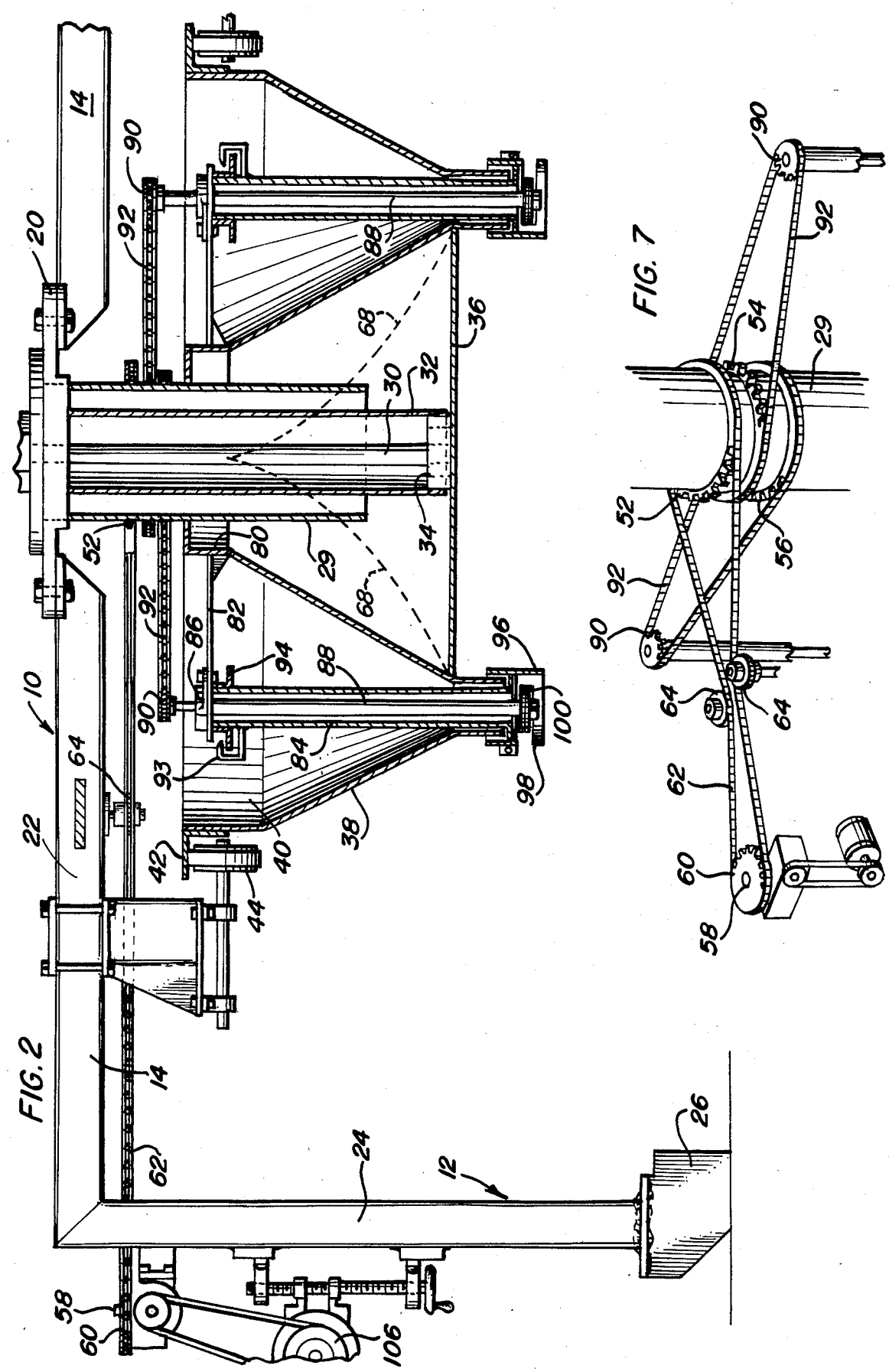

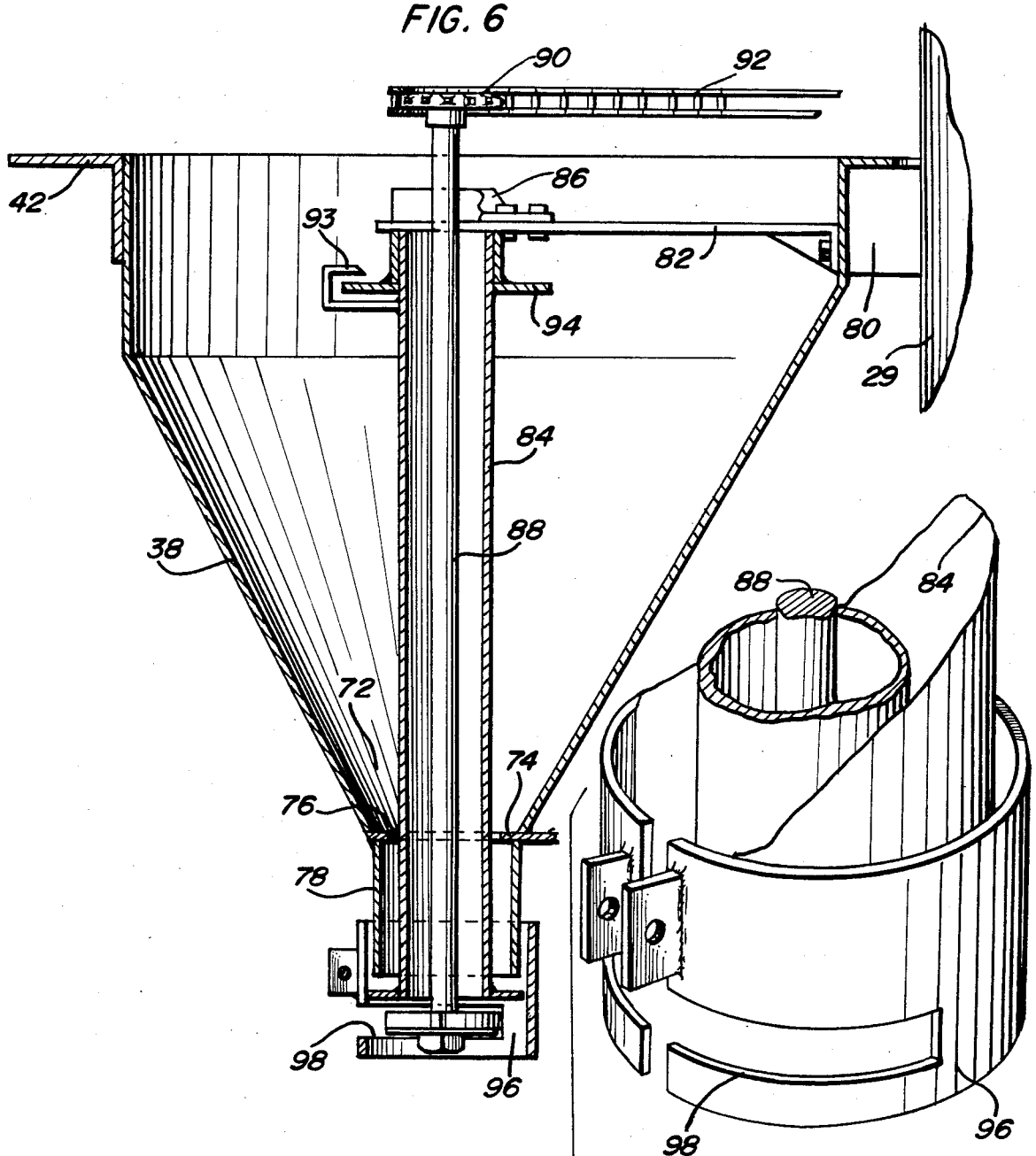
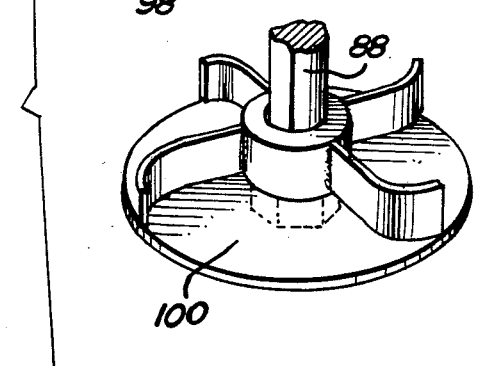

GRANULAR AND POWDERED MATERIAL FEEDER/APPLICATOR

BACKGROUND OF THE INVENTION

1. This invention relates generally to the dispensing field and more specifically to the fluent material sprinkling, spraying, and/or defusing art therein.

2. One usage of the feeder/applicator of the instant invention comprises dispensing of granular materials at a controlled rate and in a manner to provide even or desired varied rate discharge of granular material onto a predetermined dispensed granular material receiving area.

Various forms of spreaders for granular and other similar materials heretofore have been designed such as those disclosed in U.S. Pat. Nos. 1,664,031, 3,441,224, 3,652,019, 3,687,376, 4,027,627 and 4,442,979. However, these previously known devices are not specifically designed to carry out one very important possible usage of the instant invention, which usage comprises the controlled dispensing and spreading of granular batch to be melted over the top of the quantity of batch being melted within a melter and in such a manner to enable the dispensed batch to maintain a "cake" covering or layer over the heated granular batch being melted in the melter, with such "cake" covering or layer actually functioning as an insulation blanket against the radiation of large quantities of heat from the melter and thus conserving considerable quantities of energy consumed in the process of the generation of the necessary heat to melt the batch within the melter.

SUMMARY OF THE INVENTION

The granular and powdered material feeder/applicator of the instant invention has many uses and may be constructed in different forms for accomplishing prescribed tasks in various areas of industry. One important function of the feeder/applicator is the application (addition) of batch glass in a controlled manner over the entire surface of the quantity of batch being melted within a melter and withdrawn from the lower end of the melter in the manufacture of fiberglass or ceramic insulation. It is extremely important during the manufacture of insulation that the granular batch to be melted is added to the melter in a controlled rate in order that the molten glass in the bottom of the melter and being discharged therefrom may be maintained at a substantially constant temperature level and flow rate.

Various methods heretofore have been used in an attempt to add batch to a melter in manner whereby the temperature of the molten glass in the bottom of the melter may be maintained substantially constant. Some of these prior methodss include the "three-pile method" wherein three piles of batch are added to the surface of the quantity of batch being melted within the melter. The three piles of granular material added to a melter are added to the surface of the quantity of glass therein in specific spaced relation and the next three piles of batch added to the melter may be placed in other specific spaced locations over the surface of the quantity of glass within the melter.

Another method of attempting to feed granular batch to a melter involves the utilization of two vibratory screens which vibrate at a controlled rate. Yet another method of adding granular batch to the quantity of batch being melted within a melter involves the usage of mechanical arms which attempt to sprinkle granular glass over the surface of the batch within the melter.

However, these previously known methods, although each having its own advantages, incorporate disadvantages of operation, control and/or maintenance.

The feeder/applicator of the instant invention is constructed in a manner whereby substantially all of the operating components thereof may be shielded against heat from below and further in a manner whereby extremely accurate controlled application or feeding of batch granules to the surface of the quantity of batch within a melter may be accomplished. The controlled feeding of batch possible with the feeder/applicator of the instant invention even extends to the ability of feeding batch at different rates over the surface of the batch within the melter or layer over the central portion of the melter and with the "cake" or layer gradually tapering thickness toward the outer marginal portions of the melter. This is important when the melter is of the type which inherently develops higher melting temperatures at the center than at the peripheral edges of the melter.

The feeder/applicator includes an upwardly opening hopper for mounting above a melter, and with the hopper mounted for rotation about a vertical center axis. Motor structure is operatively connected to the hopper for rotating the latter at variable speeds and the bottom of the hopper includes laterally spaced granular material outlets equipped with spreader dispensing units of the type which are capable of spreading or broadcasting the granular material being dispensed from the hopper in predetermined horizontal patterns outward from the outlets for gravity falling to the surface of the quantity of batch within the hopper. The spreader dispensing units are driven by variable speed motor means and are further mounted from the hopper for selected angular displacement relative thereto about vertical axes. In this manner, a controlled and variable thickness "cake" covering or layer of fresh granular batch may be applied over the surface of batch within a melter.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the feeder/applicator;

FIG. 2 is an enlarged fragmentary vertical sectional view taken substantially upon the plane indicated by the section line 2—2 of FIG. 1 with the hopper rotated for clarity;

FIG. 3 is enlarged vertical sectional view illustrating the main drive assembly of the feeder/applicator;

FIG. 4 is a fragmentary perspective view of a portion of the structure illustrated in FIG. 3;

FIG. 6 is an enlarged fragmentary vertical sectional view illustrating the feeder and dispensing assembly;

FIG. 7 is a fragmentary perspective schematic view illustrating the drive train of the feeder and dispensing assembly;

FIG. 9 is an exploded fragmentary perspective view of the lower end portion of the feeder and dispensing assembly.

DETAILED DESCRIPTION OF THE INVENTION

Figure 8:
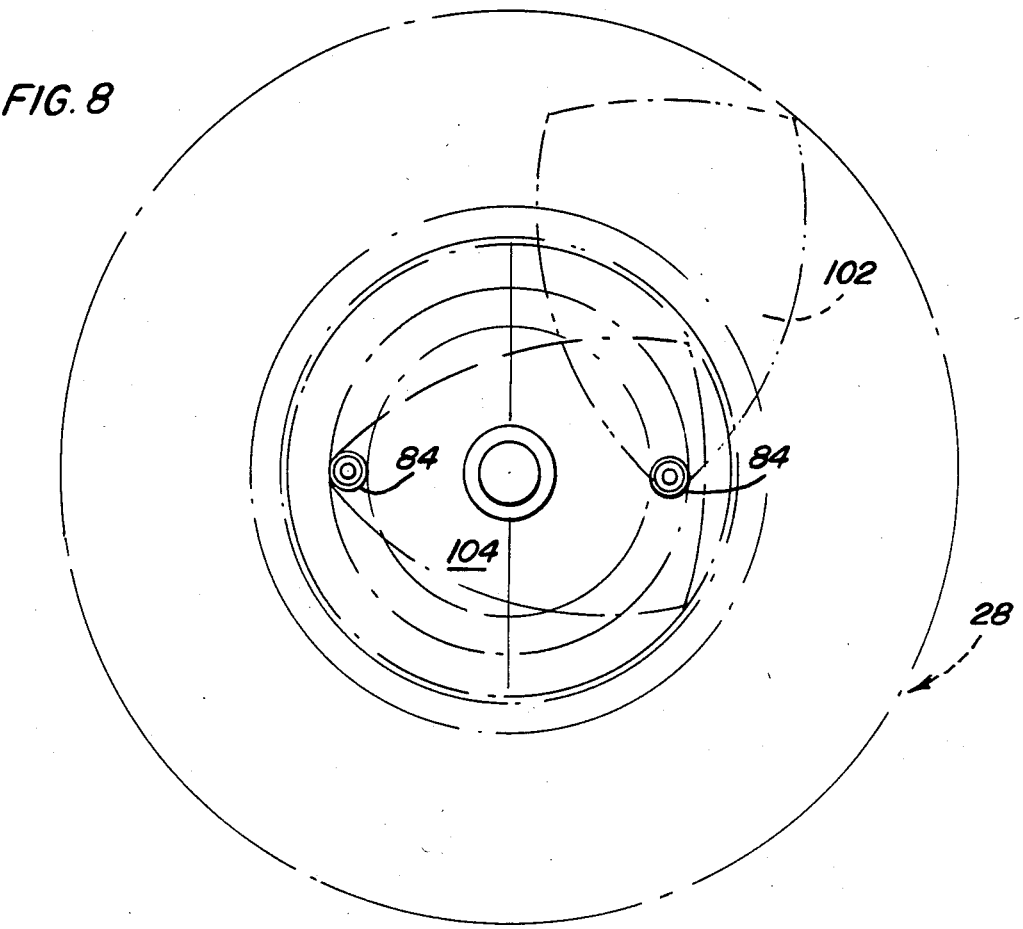
FIG. 8 is a schematic view illustrating the manner in which the feeder and dispenser assembly may be adjusted to vary the amount of granular material deposited throughout a circular dispensing area.
Figure 5:
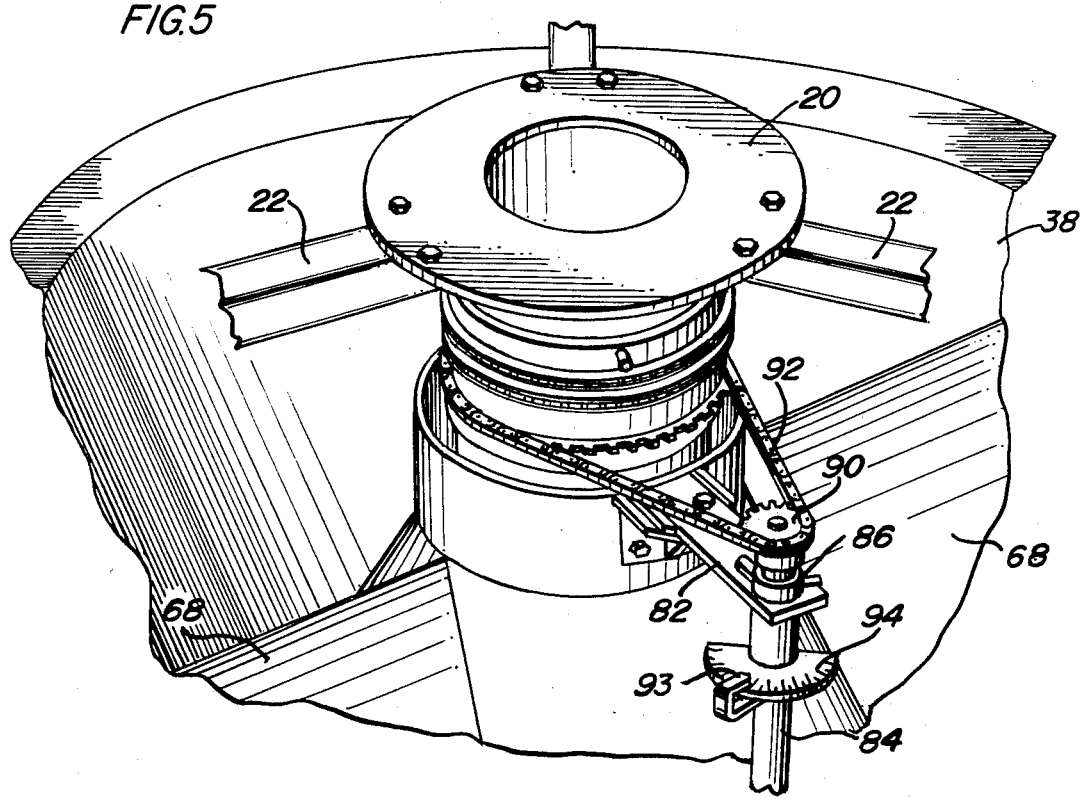
FIG. 5 is a fragmentary enlarged perspective view of a portion of the material dispensing and spreading assembly of the feeder/applicator.

Referring now more specifically to the drawings, the numeral 10 generally designates the granular and powdered material feeder/applicator assembly of the instant invention. The assembly 10 includes a three-legged frame referred to in general by the reference numeral 12 and including three inverted L-shaped legs 14, 16 and 18 anchored relative to and radiating outward from an upper center support 20. Each of the legs 14, 16 and 18 includes a horizontal arm 22 and a vertical arm 24 depending downwardly from the radial outer end of the associated horizontal arm 22. The lower end of each vertical arm 24 may be provided with suitable brackets or foot portions 26 for mounting from peripherally spaced portions of the upper rim of a circular glass melter referred to in general by the reference numeral 28 or from any other suitable support structure disposed above an area below the frame 12 upon which granular and/or powdered material is to be dispensed at a controlled rate. Such area may, of course, comprise the upper portion of the interior of the glass melter 28 or may comprise a predetermined area of a horizontally disposed conveyor system or other area upon which grandular and powdered material is to be applied or dispensed.

The assembly 10 further includes a central depending sleeve 29 journalled from the center support 20 in any convenient manner and the center support 20 may include a stationary depending center shaft 30 and a central depending stationary sleeve 32 loosely received within the sleeve 29 and loosely disposed about the shaft 30. A bearing assembly 34 mounted from a central bottom cross portion 36 of an upwardly opening hopper 38 may be journalled from both the lower end of the shaft 30 and the lower end of the sleeve 32 for a purpose to be hereinafter more fully set forth. The hopper 38 includes a substantially cylindrical open upper marginal portion 40 from which a horizontally outwardly projecting annular support flange 42 is supported and a plurality of support wheels 44, 46 and 48 are journalled from the horizonal arm portions 22 of legs 14, 16 and 18, respectively, the wheel 46 being stationarily mounted upon a shaft 48 journalled from the leg 18 and having a variable speed and reversible electric motor 50 mounted on the leg 18 drivingly coupled thereto. The weight of at least the majority of the hopper 38 is supported from the wheels 44, 46 and 48 and the wheel 46 serves to frictionally drivingly engage the hopper 38 whose lower portion 36 is at least guidingly journalled by the bearing assembly 34.

The sleeve 29 has an upper annular sprocket 52 mounted thereon for rotation therewith as well as a pair of axially spaced lower sprockets 54 and 56 mounted thereon for rotation therewith. The leg 14 journals a vertical shaft 58 from the outer side of the vertical arm 24 thereof and a sprocket wheel 60 is mounted on the shaft 58 for rotation therewith and is aligned with the sprocket 52. An endless chain 62 is trained about the sprocket wheel 60 and the sprocket 52 and has the midportions of its reaches guidlingly engaged by idle sprockets 64 journalled from opposite sides of the horizontal arm 22 of the leg 14.

With attention now invited more specifically to FIGS. 1, 2, 5 and 6 of the drawings, it may be seen that the hopper 38 includes a central divider 68 which extends along a diameter of the hopper 38 and divides the interior of the hopper 38 into two separate granular material receiving compartments 70 and 72. The compartment 70 and 72 include central bottom portions 74 having outlet openings 76 formed therein and depending cylindrical outlet sleeves 78 are secured to the under surfaces of the bottom portions 74 about the outlet openings 76.

The divider 68 defines an inner annular portion 80 of the hopper 38 which closely embraces the sleeve 29 and includes diametrically opposite radially outwardly projecting support arms 82 supported therefrom and from whose outer ends a pair of depending shield tubes 84 are supported for adjustable angular displacement about their longitudinal center axes. The outer ends of the support arms 82 also mount bearing structures from which the upper ends of vertical shafts 88 loosely received in the tubes 84 are journalled. The upper ends of the shafts 88 include sprocket wheels 90 journalled therefrom aligned with the sprockets 54 and 56 and endless chains 92 are trained about the sprockets 54 and 56 and the corresponding sprocket wheels 90. Hence, the sprockets 54 and 56 are drivingly coupled to the sprocket wheels 90. The upper ends of the shield tubes 84 include pointers 93 registrable with sector plates 94 stationarily mounted from the outer ends of the support arms 82 and the lower ends of the angularly adjustable shield tubes 84 include cylindrical spreader shields 96 mounted therefrom provided with sector slots 98 formed therein. In addition, the lower end of each vertical shaft 88 has a rotary spreader disc 100 mounted thereon for rotation therewith and registered with the corresponding slot 98. Accordingly, upon downward movement of granular material through the openings 76 about the shield tubes 84 from the compartments 70 and 72, the granular material will fall down upon and be engaged by the spreader disc 100 and flung outward through the sector slots 98 in generally the patterns 102 and 104 illustrated in phantom lines in FIG. 8. Suitable clamp structure (not shown) is operably connected between the bearing structures 86 and the shield tubes 84 and may be loosened in order to enable adjusted annular displacement of the shield tubes 84 relative to the corresponding support arms 82, the positioning of the shield tubes 84 relative to the support arms 82 being indicated by registry of the pointers 93 with the sector plates 94. When the desired angular adjustment of the shield tubes 84 is achieved, they may be secured in adjusted angularly displaced positions. Therefore, it may be seen that various portions of the patterns 102 and 104 may be overlapped or the patterns 102 and 104 may not include any registered portions. In this manner, granular material being discharged through the sector slots 98 may be applied over the upper surface of the material disposed within the melter 28 substantially as desired.

The shaft 58 is driven from a second variable speed and reversible motor 106 mounted from the outer side of the vertical arm 24 of the leg 14.

In view of the unusual drive train illustrated in FIG. 7, if the motor 50 is operative and the motor 106 is inoperative, not only will the hopper 38 be rotated about the center axis of the shaft 30, but the shafts 88 also will be rotated. However, the direction and speed of rotation of the shafts 88 may be varied during rotation of the hopper 38 by operation of the motor 106.

In operation, when it is desired to continuously apply an even coating of granular batch to the upper surface of a quantity of batch within the melter 28, the assembly 10 is placed in operation and the hopper 38 rotates about the center axis of the shaft 30 while at the same time the shafts 8 are rotated in the desired direction and the desired speed. This operation of the assembly 10 will cause spray discharge of batch through the sector openings or slots 98 in the patterns 102 and 104 illustrated in FIG. 8 for gravity falling downward upon the quantity of batch disposed within the melter 28. If the melter 28 is of the type having electrically actuated heating rods inclined toward the center thereof, the center of the mass of batch being melted within the melter 28 will be at a higher temperature than the batch adjacent the periphery of the melter 28. Thus, in order to form an effective "cake" covering or layer of newly discharged batch upon the upper surface of the quantity of batch within the melter 28, the central portion of the "cake" covering or layer should the reasonably thick and the thickness of the "cake" covering should taper toward the marginal edges of the melter 28. In order to accomplish such a tapering thickness "cake" covering or layer, the shield tubes 84 are angularly adjusted to the desired positions thereof which will provide such a tapering "cake" covering or layer. With melters utilizing other types of heating means, the overlapping or non-overlapping of the patterns 102 and 104 may be adjusted accordingly.

It is also to be noted that the hopper 38 could be mounted for rectilinear horizontal movement as well as rotary movement over a horizontally extending conveyor section for dispensing other materials onto the conveyor in a specifically desired manner, or the hopper 38 could be mounted only for rotary movement over such a horizontal conveyor section. Further, the hopper 38 could be stationarily mounted over a horizontal conveyor portion with only angular adjustment of the shield tubes 84 being utilized to provide the desired application of the granular material onto the associated conveyor section.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A fluent granular material dispenser including a hopper for receiving bulk quantities of fluent grandular material and including at least two laterally spaced lower outlets, dispensing means operatively associated with each of said outlets for controllably dispensing fluent material therefrom for free gravity falling onto a predetermined generally circular horizontal dispensed material receiving area disposed below said hopper, mounting means mounting said hopper for rotary movement about an upstanding axis spaed between said laterally spaced lower outlets and generally centered relative to said area.

2. The dispenser of claim 1 wherein said mounting means includes means operative to vary the speed of rotation of said hopper.

3. The dispenser of claim 1 wherein said dispensing means includes means for varying the velocity and flow rate of material dispensed therefrom independently of variations in the spaced of rotation of said hopper.

4. The dispenser of claim 1 wherein each of said dispensing means includes means operative to dispense material therefrom in sector-shaped horizonal patterns.

5. The dispenser of claim 4 wherein each of said dispensing means includes adjustment means for independently adjustably angularly displacing the corresponding horizontal pattern about a vertical axis adjacent the corresponding outlet and within the radius distance of the discharge of the sector-shaped pattern of material dispensed from the other dispensing means.

6. The dispenser of claim 1 wherein said hopper defines individual upwardly opening compartments into which bulk quantities of fluent granular material may be discharged, each of said outlets opening downwardly from a corresponding compartment.

7. A fluent granular material dispenser including a hopper for receiving bulk quantities of fluent granular material, mounting means mounting said hopper for rotary movement about an upstanding axis passing centrally through said hopper, said hopper including lower outlet means having dispensing means operatively associated with said outlet means for controllably dispensing fluent material from said outlet means for free gravity falling onto a predetermined generally circular horizontal dispensed material receiving area disposed below said hopper and generally centered relative to said axis, said outlet means and said dispensing means including means operatively to adjustably dispense granular material over said area, during rotation of said hopper, in a manner to form a layer of dispensed material throughout said area with said layer tapering in thickness from the center of said area toward the outer periphery thereof.

8. The dispenser of claim 7 wherein said outlet means includes a pair of outlets spaced on opposite sides of said axis.

9. The dispenser of claim 7 wherein said dispensing means includes means for varying the velocity and flow rate of material dispensed therefrom independently of variations in the speed of rotation of said hopper.

10. The dispenser of claim 8 wherein said dispensing means includes means operative to dispense material from each outlet in a sector-shaped horizontal pattern.

11. The dispenser of claim 9 wherein said dispensing means includes adjustment means for independently adjustable angularly displacing each of said patterns about a vertical axis adjacent the corresponding outlet and within the radius distance of the discharge of the sector-shaped pattern of material dispensed from the other dispensing means.

* * * * *